Aug. 24, 1965  W. H. TRASK  3,202,412
SHOCK ATTENUATING DEVICES
Filed March 6, 1964  2 Sheets-Sheet 1
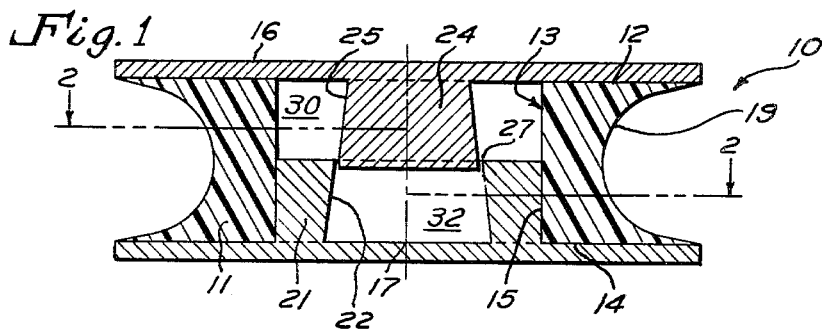
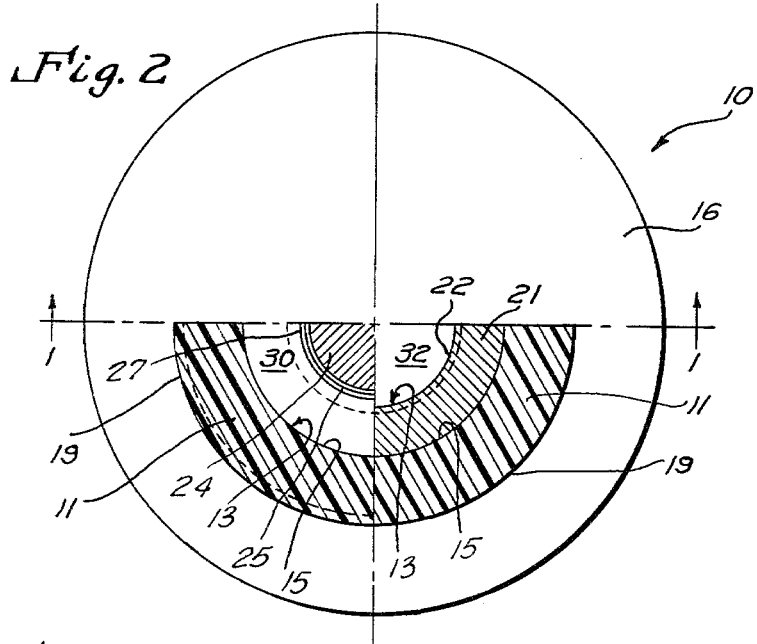
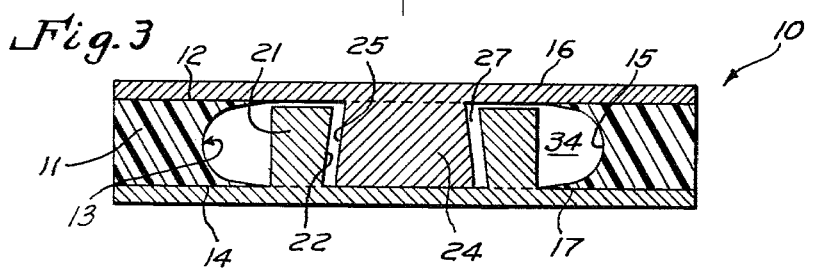
INVENTOR.
Walter H. Trask
BY Edward F. Jurow
Atty.

Aug. 24, 1965  W. H. TRASK  3,202,412
SHOCK ATTENUATING DEVICES
Filed March 6, 1964  2 Sheets-Sheet 2

INVENTOR.
Walter H. Trask
BY Edward F. Jurow
Atty.

United States Patent Office 3,202,412
Patented Aug. 24, 1965

3,202,412
SHOCK ATTENUATING DEVICES
Walter H. Trask, Santa Clara, Calif., assignor to W. H. Miner, Inc., Chicago, Ill., a corporation of Delaware
Filed Mar. 6, 1964, Ser. No. 349,846
14 Claims. (Cl. 267—1)

This invention relates, generally, to shock attenuating units or devices, so-called shock absorbing mechanisms, which dissipate the energy of applied load or impact forces, and it has particular relation to shock absorbing units or devices for use as or in draft gears for railroad cars.

This is a modification of the invention disclosed in my co-pending application, Serial No. 7,308, filed February 8, 1960, now U.S. Patent No. 3,145,585, dated May 26, 1964, the specification and drawings of which are incorporated herein by reference.

Shock attenuating or absorbing units as described herein employ a resilient member of a material having the property of self-restoration, namely, restoring itself to the configuration it had prior to its distortion by the application of a load force thereto, such characteristic or self-restoration being aided by the factor of securing or bonding a resilient member to a support element which is non-extensible and non-distortable under normal or practical temperatures and pressures. The bonding of the resilient member to the support element permits the material of said member to flow, as by molecular movement, in regions thereof removed from immediate contact with the support element; upon release of the distorting force, the natural resilience or elasticity returns said member to its undistorted original position relative to the support element. Shock absorbing devices exhibiting the aforementioned characteristics of self-restoration are known in the art, and although generally satisfactory for certain shock absorbing applications, such devices have an undesirably high reaction force and, upon release of the distorting force, a high percentage of the energy of impact stored in the device during distortion is released in the form of recoil.

Accordingly, an object of the present invention is to provide a shock attenuating unit employing a resilient member, such as rubber, and having decreased recoil and increased shock absorbing capacity as compared to the use of the resilient member per se.

Another object of the present invention is to provide a new and novel shock attenuating unit which is only partly formed of resilient material and which has improved operational characteristics over similar known type units formed wholly of resilient material, while preserving unchanged those desirable characteristics of such wholly resilient units including simplicity, economy, ruggedness, adaptability, etc.

Another object of the invention is to simplify the construction of a shock absorber employing hydraulic operating principles which will be more economical to manufacture than conventional hydraulic shock absorbers heretofore used.

Another object of this invention is to provide a shock attenuating unit comprising one or more non-extensible support elements bonded to a like number of surfaces of a resilient member having a cavity or chamber containing a flowable dampening medium whereby the hysteresis of the unit as a whole is enhanced.

Still another object of this invention is to provide a shock attenuating unit or device in which the resilient member, bonded to a non-extensible support element, provides the primary if not the sole restoring force to return a mass of pressure deformable, substantially non-compressible and non-resilient material, contained within a cavity or chamber in the resilient member, to its original configuration after the deforming force has been dissipated or removed.

Another more detailed object of this invention is to provide a shock attenuating unit or device of the character described wherein telescopically associated orifice defining means are provided in the cavity or chamber through which the flowable dampening medium is metered during compression of the unit or device whereby to improve the shock absorbing characteristics thereof.

Other objects of this invention will, in part, be obvious and appear hereinafter.

This invention is disclosed in the embodiments thereof shown in the accompanying drawings and it comprises the features of construction, combination of elements and arrangement of parts which will be exemplified in the structures hereinafter set forth and the scope of the application as indicated in the appended claims.

For a more complete understanding of the nature and scope of this invention, reference can be had to the following detailed description, taken together with the accompanying drawings, in which:

FIGURE 1 is a central vertical section through a shock attenuating unit embodying the invention taken along line 1—1 of FIGURE 2;

FIGURE 2 is a composite view of the unit shown in FIGURE 1 with the upper half thereof being in plan and with the lower half thereof being in horizontal section taken along line 2—2 of FIGURE 1;

FIGURE 3 is a vertical central section similar to FIGURE 1 with the unit shown under maximum compression;

Figure 4:
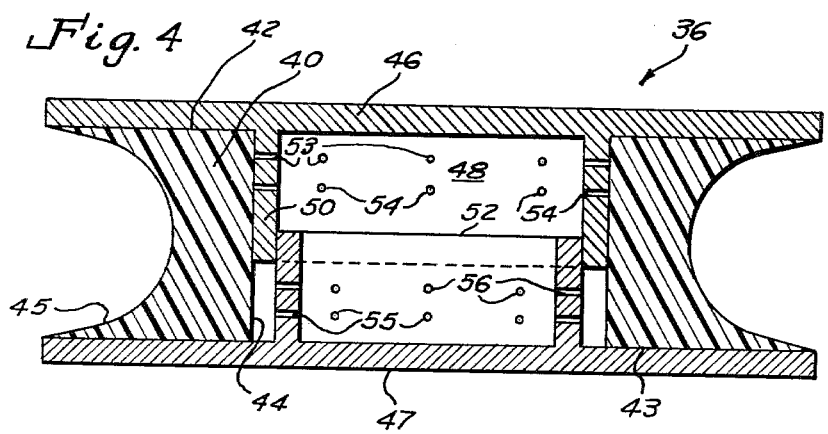
FIGURE 4 is a central vertical section similar to FIGURE 1 of another unit embodying the invention.

Referring now to the structural details shown in the drawings, FIGURE 1 shows a generally cylindrical shock attenuating pad or unit 10 embodying one form of the invention in its normal non-distorted condition and FIGURE 3 shows the same unit in its fully stressed or distorted condition.

The unit 10 comprises, in general, a unitary resilient member 11 having a pair of opposite and parallel force-receiving surfaces 12 and 14 and a generally cylindrical central opening 15 which extends therethrough between the pair of force-receiving surfaces. A pair of rigid non-extensible circular end support elements 16 and 17 are bonded to the force-receiving surfaces 12 and 14, respectively, of the resilient member 11 in a manner such that same overlie the opposite ends of the central opening 15 therein whereby to provide a closed chamber 13 within the unit 10.

As will be described in greater detail hereinafter, the chamber 13 is filled with a suitable dampening medium whereby the units are characterized by substantially improved shock attenuating properties. Although not shown in the drawings, each unit disclosed herein may be provided with means for introducing a suitable dampening medium into the closed chamber thereof, for instance, suitable openings and closures therefor.

The resilient member 11 consists of rubber or rubber-like material whereas the support elements 16 and 17 are of a material, such as metal, which under normal or practical conditions is non-extensible. With this structural arrangement wherein the resilient rubber-like member 11 is bonded between the pair of non-distortable support elements 16 and 17, data points are provided to which the rubber-like material will return after distorting forces have been removed therefrom, whereby the resilient member assumes its original configuration. Preferably, as illustrated in the drawings, the support elements are bonded to the entire areal extent of the force-receiving surfaces of the resilient member.

For the purposes of this invention, the exterior configuration of the shock attenuating units may be varied within wide limits to include a multiplicity of shapes. The unit 10 illustrated in FIGURES 1–3 as well as the two additional forms of units illustrated in FIGURES 4 and 5, respectively, are generally circular or disc-like in configuration. It has been found that the application of compression forces in an axial direction to a generally circular shock attenuating unit, such as the unit 10 of FIGURE 1, causes the rubber-like material of the resilient member 11 to flow outwardly away from the axial center thereof when the chamber 13 is filled with a flowable or deformable dampening medium. Therefore, for reasons which are believed to be obvious, units of this type, particularly those which are to be disposed in a confining cylindrical housing, preferably have the peripheral edges of the resilient members thereof concavely recessed, as at 19 in FIGURE 1.

It has been found that when the closed chambers of the shock attenuating units disclosed herein are filled with a dampening medium which is of the flowable type, such as a low viscosity liquid or a high viscosity plastic solid such as asphalt or wax, that the shock attenuating characteristics of the unit may be substantially improved by providing orifice means within the closed chamber through which all or a portion of the flowable dampening medium is metered during compression of the unit. The particular shape, number and location of the orifice means and any sub-chambers that are formed within the closed chambers may be chosen to optimize the flow characteristics of the particular dampening medium being used, such that its resistance to flow or deformation will dominate or appreciably affect the over-all resistance-to-distortion characteristics of the unit as a whole, and particularly affect the normal resistance-to-distortion characteristics of the resilient member alone.

The particular shock attenuating unit 10 illustrated in FIGURES 1–3 is provided with telescopically associated means within the closed chamber 13 which define an annular orifice 27, the area of which increases as the unit 10 is compressed. More specifically, the support element 17 is provided on its inner surface with an annular formation 21 which is centered thereon and which is integral or rigid therewith. The annular formation 21, which has an outer diameter which is approximately equal to the diameter of the cylindrical opening 15 in the resilient member 11, extends inwardly of the chamber 13 a distance which is approximately equal to one-half the distance between the support elements 16 and 17 when the unit 10 is in its normal non-compressed condition. For a purpose which will be explained hereinafter, the inner surface 22 of the annular formation 21 is tapered at a slight angle whereby same converges conically in a direction away from the support element 17.

The shock attenuating unit 10 is further characterized by a centrally located generally cylindrical plug-like formation 24 which projects inwardly from the center of the inner face of the support element 16, being integral or rigid therewith, into slight or initial telescopic relationship within the annular formation 21. As best illustrated in FIGURE 1, when the shock attenuating unit 10 is in its normal non-stressed condition, the plug-like formation 24 projects inwardly of the chamber 13 a distance which is slightly greater than one-half the distance between the two end support elements 16 and 17 whereby the end of the formation 24 is disposed just within the generally conical recess defined by the inner surface 22 of the annular formation 21. The outer peripheral surface 25 of the plug-like formation 24 is tapered complementary to the inner surface 22 of the annular formation 21 in a manner such that same diverges conically in a direction away from the support element 16 at the same slight angle as that for the annular formation 21.

A specified spacing is provided between the telescopically associated annular formation 21 and the plug-like formation 24 whereby annular or ring-like orifice means 27 is defined between the two formations 21 and 24 during the full range of compression of the unit 10. In a unit of the type illustrated in FIGURES 1, 2 and 3, wherein the telescopically associated formations 21 and 24 are tapered, as described, with the inner end of the plug-like formation 24 being both larger in diameter than the support plate end thereof and smaller, by a predetermined amount, than the inner diameter of the annular formation 21 at the smallest diameter inner end thereof, the effective horizontal cross-sectional area of the annular orifice means 27 increases as the two formations 21 and 24 are telescoped one into the other during compression of the shock attenuating unit 10. This physical characteristic of the shock attenuating unit 10 may best be seen by a comparison of FIGURES 1 and 3. If the surfaces 22 and 25 of the formations 21 and 24, respectively, were not tapered, the effective orifice area would remain generally constant during compression of the unit.

As best illustrated in FIGURE 1, when the unit 10 is in its normal non-compressed condition, the annular formation 21 and the plug-like formation 24 define within the chamber 13 an annular sub-chamber 30 adjacent the support element 16 and a generally cylindrical subchamber 32 adjacent the support element 17 with the two subchambers 30 and 32 being interconnected by the annular orifice means 27. The sub-chambers 30 and 32 are filled with a suitable flowable dampening medium of the character previously described herein. Thus, when generally axial compression forces are exerted on the shock attenuating unit 10, the flowable dampening medium in the sub-chamber 32 is metered through the orifice means 27 into the sub-chamber 30 and from there into an auxiliary chamber or sub-chamber 34 of annular configuration which is formed outwardly of the annular formation 21 as a result of radial outward distortion or bulging of the resilient member 11 as compression forces are exerted thereon. In the shock attenuating unit 10 wherein the effective area of the orifice means 27 increases as the unit is compressed, the resistance to the compression forces resulting from the metering of the dampening medium decreases as the unit is compressed.

By varying the design of the specific orifice defining means in a particular unit, the operational characteristics may be selected as desired to provide units in which the resistance to compression offered by the unit either increases or decreases or remains generally constant as the unit is compressed. For instance, two modified forms of shock attenuating units 36 and 38 wherein the resistance offered to compression forces applied thereto increases during closure of the unit as a result of decreasing orifice areas are illustrated in FIGURES 4 and 5, respectively.

As previously described in connection with the form of the invention illustrated in FIGURES 1, 2 and 3, the shock attenuating units 36 and 38 illustrated in FIGURES 4 and 5 each include a unitary resilient member having a pair of opposite parallel force-receiving surfaces and a generally cylindrical central opening extending therethrough, a pair of non-extensible end support elements each bonded to one of the force-receiving surfaces of the resilient member and overlying the opposite ends of the central opening therein to provide a closed chamber, and telescopically associated orifice defining means within the chamber, each chamber being filled with a suitable flowable dampening medium.

Figure 5:
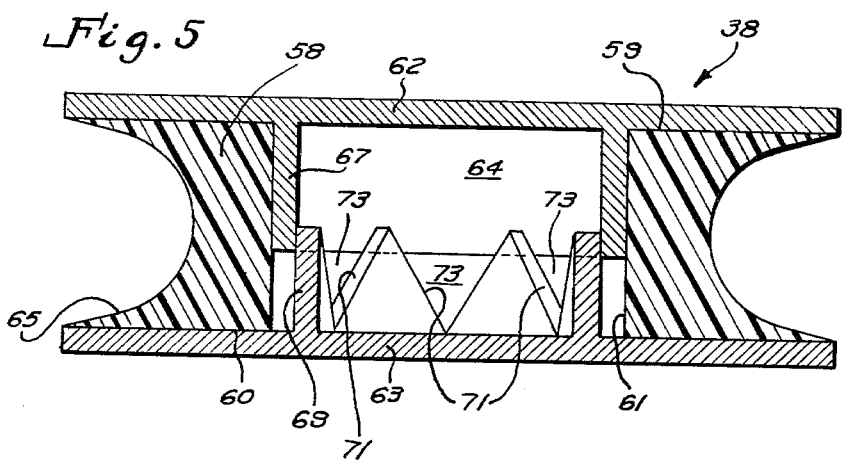
FIGURE 5 is a central vertical section similar to FIGURES 1 and 4 of still another unit embodying the invention.

More specifically, the shock attenuating unit 36 of FIGURE 4 includes a generally cylindrical resilient member 40 which is characterized by a pair of opposite parallel force-receiving surfaces 42 and 43, by a cylindrical central opening 44 extending therethrough, and by an outer periphery which is recessed as at 45, and a pair of non-extensible end support elements 46 and 47 bonded respectively to the force-receiving surfaces 42 and 43 and overlying the ends of the opening 44 whereby to define a closed chamber 48 within the unit 36 which is filled with a suitable flowable dampening medium.

The orifice defining means of the shock attenuating unit 36 of FIGURE 4 includes a pair of telescopically associated tubular members 50 and 52 which are centered on the inner surfaces of the support elements 46 and 47, respectively, and are disposed within the chamber 48. The tubular members 50 and 52 are rigid with their associated support elements and, as illustrated, may be integral therewith. The outer tubular member 50 has an outer diameter which is approximately equal to the diameter of the opening 44 in the resilient member 40 with the inner tubular member 52 having a sliding fit in the outer member 50 whereby annular orifice means of the character provided in the shock attenuating unit 10 of FIGURES 1, 2 and 3 is not defined therebetween.

To provide suitable orifice means, the outer tubular member 50 is provided with a first series of circumferentially spaced transverse orifice passages 53 which are spaced a relatively short distance from the support element 46 and a second series of circumferentially spaced transverse orifice passages 54 which are spaced a greater distance from the support element 46. Likewise, the inner tubular member 52 is provided with a first series of circumferentially spaced transverse orifice passages 55 which are spaced a relatively short distance from the support element 47 and a second series of circumferentially spaced transverse orifice passages 56 which are spaced a greater distance from the support element 47.

During compression of the unit 36, the flowable dampening medium filling the chamber 48 is metered through the several series of orifice passages into an annular auxiliary chamber or sub-chamber (not shown) which is formed outwardly of the tubular members 50 and 52 as a result of radial outward distortion or bulging of the resilient member 40 as same is compressed. The auxiliary chamber would be similar to the auxiliary chamber 34 of the unit 10 as shown in FIGURE 3. The resistance to closing offered by the unit 36 increases with the physical compression or distortion thereof as certain of the series of orifice passages are closed in sequence with the effective orifice area being progressively reduced as a result thereof. More specifically, as closure or compression of the unit 36 progresses and the tubular members 50 and 52 are telescoped together, the first series of orifice passages to be closed are passages 56 after which passages 54, 55 and 53 are in turn closed. When the unit 36 is fully compressed, all of the orifice passages are closed and the end of the outer tubular member 50 abuts against the inner surface of the support element 47.

The unit 38 of FIGURE 5 includes a generally cylindrical unitary resilient member 58 which is characterized by a pair of opposite parallel force-receiving surfaces 59 and 60, by a cylindrical central opening 61 extending therethrough, and by an outer periphery which is recessed as at 65, and a pair of non-extensible end support elements 62 and 63 bonded to the force-receiving surfaces 59 and 60, respectively, and overlying the opposite ends of the opening 61 whereby to define a closed chamber 64 which is filled with a suitable flowable dampening medium.

The orifice defining means of the unit 38 of FIGURE 5 comprises a pair of telescopically associated generally tubular members 67 and 69 which are centered on the inner surfaces of the support elements 62 and 63, respectively, and are disposed within the chamber 64. The generally tubular members 67 and 69 are rigid with their associated support elements and, as illustrated, may be integral therewith. The outer diameter of the outer tubular member 67 is approximately equal to the diameter of the opening 61 in the resilient member 58 and the sliding fit of the inner generally tubular member 69 within the outer tubular member 67 is such that no annular orifice means of the type provided in the shock attenuating unit 10 illustrated in FIGURES 1, 2 and 3 is defined between the generally tubular members 67 and 69.

However, as illustrated, the inner generally tubular member 69 has a saw-toothed configuration inasmuch as same is provided with a series of circumferentially arranged longitudinally extending V-shaped slots 71 which terminate at the inner surface of the support element 63. The portions of the V-shaped slots 71 not covered by the outer tubular member 67 define triangular-shaped orifice openings 73 through which the flowable dampening medium is metered during compression of the unit 38. The effective orifice area of the slots 71 decreases as the generally tubular members 67 and 69 are telescoped together during compression of the shock attenuating unit 38 with the unit's resistance to compression or closure increasing as a result thereof. During compression of the unit 38, the flowable dampening medium is metered through the orifice slots 71 into an annular auxiliary chamber or sub-chamber (not shown but similar to the chamber 34 of FIGURE 3) which is formed outwardly of the tubular members 67 and 69 as a result of radial outward distortion or bulging of the resilient member 58 as same is compressed. It is noted that the longitudinal slots 71 could be other than V-shaped. For instance, they could be elongated slots of uniform width throughout their length.

From the foregoing descriptions of three specific forms or embodiments of the invention, it will be appreciated that the objects of the invention are attained, in brief, by forming a chamber within a resilient rubber-like member or pad, by providing suitable orifice defining means within the chamber, and by filling the chamber with a flowable dampening medium or material of the type which is substantially non-compressible and which enmasse has little or no resiliency. Upon the application of compressive distorting load forces to the units illustrated and described herein, portions of the forces are transmitted into the resilient material for storage therein with the balance thereof being transmitted into the dampening medium to be expended or attenuated therein and transformed into heat energy as a result of the dampening medium being metered through the various orifice means provided and as a result of molecular friction or cohesion. The distorted or fully compressed shock attenuating units are returned to their unstressed or normal configurations after removal or dissipation of the impact or distorting force solely by the resilient member thereof without undesirable recoil action inasmuch as the dampening medium is again metered through the orifice means provided within the closed chamber. The shock attenuating units described herein have much greater performance characteristics than conventional all-rubber units or coil spring units as a result of the hereindescribed structural modifications which while improving the performance have preserved the desirable properties of conventional all-rubber shock attenuating units such as simplicity, economy, ruggedness, adaptability, etc.

Although not illustrated in the drawings, it is noted that the shock attenuating units disclosed herein may be used in various stacked arrangements so as to obtain the desirable performance characteristics for a specific installation.

It is apparent from the foregoing description that many additional variations may be utilized in the manufacture of shock attenuating units according to the invention. Also new synthetic materials are constantly being developed and made commercially available, many of which undoubtedly will be found adaptable either as flowable dampening mediums or as resilient members for such units. The invention lies in the physical relation or mechanical correlation of suitable components, and their individual composition is important only in the sense that the individual properties of the elements of any mechanical assemblage are important to their proper combination and co-action. One skilled in the art will know or may deduce with confidence from his own knowledge the applicabilty of available materials to the purposes of the invention, and in the case of novel materials, routine tests not of an inventive nature will provide reliable data. It is intended, therefore, that all matters shown in the accompanying drawings and described hereinbefore shall be interpreted as illustrative and not in a limiting sense.

I claim:

1. A compressible shock attenuating unit comprising, a unitary resilient member having a pair of opposite and parallel force-receiving surfaces and a generally cylindrical central opening extending therethrough between said pair of force-receiving surfaces, a pair of non-extensible support elements each bonded to one of said force-receiving surfaces and overlying the opposite ends of said central opening to provide a closed chamber, the wall portion of said resilient member intermediate said bonded force-receiving surfaces being distortable radially outwardly upon movement of said non-extensible support elements toward one another upon the application of compression forces to the unit, separate means fixedly associated with each one of said pair of support elements and extending inwardly of said chamber with said means serving to divide said chamber into at least two parts, a flowable dampening medium filling both parts of said chamber, and orifice means defined between said two parts of said chamber by said separate means fixedly associated with said support elements, the volumes of said two parts of said chamber being varied during compression of said unit and movement of said separate means fixedly associated with said support elements toward one another with one part of said chamber decreasing in volume and the other part increasing in volume and with said dampening medium being metered through said orifice means between said two parts of said chamber from the part which decreases in volume to the part which increases in volume, whereby to attenuate compressive shock forces applied to said unit.

2. A compressible shock attenuating unit as recited in claim 1 wherein said orifice defining means fixedly associated with said support elements are telescopically associated for movement relative to one another during compression of said unit.

3. A compressible shock attenuating unit as recited in claim 1 wherein the arrangement of said orifice defining means is such that the area of said orifice means decreases during compression of said unit.

4. A compressible shock attenuating unit as recited in claim 1 wherein the arrangement of said orifice defining means is such that the area of said orifice means increases during compression of said unit.

5. A compressible shock attenuating unit as recited in claim 1 wherein said orifice defining means comprises a pair of telescopically associated members centered one each on the inner surfaces of said pair of support elements and disposed within said closed chamber, the outer peripheral surface of the inner one of said telescopically associated members being spaced inwardly of the inner surface of the outer one of said members whereby to define annular orifice means therebetween during compression of said unit and the resulting relative telescopic movement between said orifice defining members.

6. A compressible shock attenuating unit as recited in claim 1 wherein said orifice defining means comprises a pair of telescopically associated tubular members centered one each on the inner surfaces of said pair of support elements and disposed within said closed chamber, and a plurality of transverse orifice passages formed in said pair of tubular members in a manner such that the effective orifice area is decreased during compression of said unit.

7. A compressible shock attenuating unit as recited in claim 1 wherein said orifice defining means comprises a pair of telescopically associated generally tubular members centered one each on the inner surfaces of said pair of support elements and disposed within said closed chamber, at least one of said generally tubular members having circumferentially spaced longitudinally extending slots formed therein and defining orifice means the area of which decreases during compression of said unit as said generally tubular members are telescoped one into the other.

8. A compressible shock attenuating unit as recited in claim 1 wherein said orifice defining means comprises a pair of telescopically associated generally tubular members centered one each on the inner surfaces of said pair of support elements and disposed within said closed chamber, one of said generally tubular members having circumferentially spaced longitudinally extending V-shaped slots formed therein and terminating at the support element associated therewith whereby to define a saw-tooth configuration, said V-shaped slots defining orifice means the area of which is progressively decreased as said tubular members are telescoped one into the other during compression of said unit.

9. A compressible shock attenuating unit comprising, a unitary resilient member having a pair of opposite and parallel force-receiving surfaces and a generally cylindrical central opening extending therethrough between said pair of force-receiving surfaces, a pair of non-extensible support elements each bonded to one of said force-receiving surfaces and overlying the opposite ends of said central opening to provide a closed chamber, an annular member on one of said support elements and a complementary plug-like member on the other support element, said complementary members being disposed within said chamber in a manner defining two sub-chambers and orifice means extending therebetween, and a flowable dampening medium filling said sub-chambers, which dampening medium, upon compression of said unit, is metered from one of said sub-chambers through said orifice means into the other sub-chamber and then into an auxiliary chamber formed outwardly of said complementary members as a result of radial outward distortion of said compressed resilient member.

10. A compressible shock attenuating unit comprising, a unitary resilient member having a pair of opposite and parallel force-receiving surfaces and a generally cylindrical central opening extending therethrough between said pair of force-receiving surfaces, a pair of non-extensible support elements each bonded to one of said force-receiving surfaces and overlying the opposite ends of said central opening to provide a closed chamber, a pair of telescopically associated tubular members disposed in said chamber with each being associated with and movable with a different one of said support elements, the outer one of said members being disposed against the inner surface of said resilient member defining said opening therethrough, a plurality of transverse orifice passages formed in each of said tubular members in a manner such that as said members are telescoped together during compression of said unit each of said orifice passages is closed in turn with all of said passages being closed at full closure of said unit, and a flowable dampening medium filling the spaces defined in said closed chamber by said pair of tubular members and said support elements, which dampening medium, upon compression of said unit, is metered through said orifice passages into an auxiliary chamber formed outwardly of said tubular members as a result of radial outward distortion of said compressed resilient member.

11. A compressible shock attenuating unit comprising, a unitary resilient member having a pair of opposite and parallel force-receiving surfaces and a generally cylindrical central opening extending therethrough between said pair of force-receiving surfaces, a pair of non-extensible support elements each bonded to one of said force-receiving surfaces and overlying the opposite ends of said central opening to provide a closed chamber, a pair of telescopically associated generally tubular members disposed in said chamber with each being associated with and movable with a different one of said support elements, the outer one of said members being disposed against the inner surface of said resilient member defining said opening therethrough, said inner tubular member having a saw-tooth configuration defined by a series of circumferentially spaced longitudinal V-shaped slots formed therein, which slots terminate at the support element associated therewith and define orifice means the area of which is progressively decreased as said outer tubular member is telescoped over said inner V-slotted tubular member during compression of said unit, and a flowable dampening medium filling the spaces defined in said closed chamber by said pair of generally tubular members and said support elements, which dampening medium, upon compression of said unit, is metered through said orifice means into an auxiliary chamber formed outwardly of said generally tubular members as a result of radial outward distortion of said compressed resilient member.

12. A compressible shock attenuating unit comprising, a unitary resilient member having a pair of opposite parallel force-receiving surfaces and a generally cylindrical central opening extending therethrough between said pair of force-receiving surfaces, a pair of non-extensible elements each bonded to one of said force-receiving surfaces and overlying the opposite ends of said central opening to provide a closed chamber, an annular formation disposed on the inner surface of one of said support elements and extending inwardly of said chamber, the outer diameter of said annular formation being approximately equal to the diameter of said chamber, a centrally located generally cylindrical plug-like formation projecting inwardly from the inner face of said other support element into initial telescopic relationship in said annular formation when said unit is in a non-compressed condition, whereby said telescopically related formations divide said closed chamber into a generally cylindrical sub-chamber adjacent said one support element and an annular sub-chamber adjacent said other support element, the outer diameter of said plug-like formation being less than the inner diameter of said annular formation whereby to define annular orifice means interconnecting said two sub-chambers, and a flowable dampening medium filling said sub-chambers, which dampening medium, upon compression of said unit and telescopic movement of said plug-like formation into said annular formation, is metered from said generally cylindrical sub-chamber through said annular orifice means and from said annular sub-chamber into an auxiliary chamber of annular configuration which is formed outwardly of said annular formation as a result of radial outward distortion of said compressed resilient member.

13. A compressible shock attenuating unit as recited in claim 12 wherein said telescopically related formations are tapered in a manner such that the area of said annular orifice means increases progressively with compression of said unit.

14. A compressible shock attenuating unit as recited in claim 12 wherein the inner surface of said annular formation converges conically in a direction away from said one support element at a slight angle and wherein the outer surface of said plug-like formation diverges conically in a direction away from said other support element at said same slight angle, whereby the radial dimension of said annular orifice means is progressively increased during compression of said unit.

References Cited by the Examiner

UNITED STATES PATENTS

| | | | |
|---|---|---|---|
| 949,833 | 2/10 | Mueller. | |
| 1,067,130 | 7/13 | Newell. | |
| 1,320,060 | 10/19 | Jenney. | |
| 1,792,160 | 2/31 | Granges. | |
| 2,262,823 | 11/41 | Stearns. | |
| 2,535,080 | 12/50 | Lee | 248—358 |
| 2,818,249 | 12/57 | Boschi | 267—33 |
| 3,027,152 | 3/62 | Deschner | 267—1 |

ARTHUR L. LA POINT, *Primary Examiner.*